US011857996B2

(12) United States Patent
Ortendahl

(10) Patent No.: US 11,857,996 B2
(45) Date of Patent: Jan. 2, 2024

(54) DEVICE AND METHOD FOR COATING A CIRCULAR CYLINDRICAL OBJECT

(71) Applicant: Ivan Patrik Ortendahl, Vanoxa (FI)

(72) Inventor: Ivan Patrik Ortendahl, Vanoxa (FI)

( * ) Notice: Subject to any disclaimer, the term of this patent is extended or adjusted under 35 U.S.C. 154(b) by 0 days.

(21) Appl. No.: 18/000,294

(22) PCT Filed: Jun. 4, 2021

(86) PCT No.: PCT/SE2021/050539
§ 371 (c)(1),
(2) Date: Nov. 30, 2022

(87) PCT Pub. No.: WO2021/246952
PCT Pub. Date: Dec. 9, 2021

(65) Prior Publication Data

US 2023/0120421 A1 Apr. 20, 2023

(30) Foreign Application Priority Data

Jun. 5, 2020 (SE) .................................... 2050655-6

(51) Int. Cl.
*B05C 17/00* (2006.01)
*B05C 5/02* (2006.01)
(Continued)

(52) U.S. Cl.
CPC .......... *B05C 5/0241* (2013.01); *B05C 17/002* (2013.01); *B05C 17/00516* (2013.01); *B05D 1/26* (2013.01)

(58) Field of Classification Search
CPC ........ B05B 13/02; B05C 17/00; B05C 17/002
See application file for complete search history.

(56) References Cited

U.S. PATENT DOCUMENTS 1,988,628 A 1/1935 Mcdonald et al.
3,334,639 A * 8/1967 Grant ...................... E21B 41/02 118/316

(Continued)

FOREIGN PATENT DOCUMENTS

EP 0490000 A1 * 12/1990
EP 0490000 A1 6/1992

(Continued)

OTHER PUBLICATIONS

Swedish Intellectual Property Office, Stockholm, Sweden, International Search Report, dated Jun. 28, 2021.

*Primary Examiner* — Cachet I Proctor
(74) *Attorney, Agent, or Firm* — Noréns Patentbyrá AB

(57) ABSTRACT

The invention relates to a tool (1) for applying liquid agent such as, for example, an insulating foam, an adhesive, or paint to the mantle surface of a circular-cylindrical object (10), comprising a tool head (2) having an axially through hole (3) with a substantially circular cross-section. The tool head (2) comprises an inner flange (8), an outer flange (16), a distribution chamber (12) running around the inner flange (8) and that comprises at least one outlet (13; 23; 33) distributed around the through hole (3). An asymmetrical restriction is arranged at the outlet (13) so that the outlet is restricted where the pressure is as highest (14). The invention also relates to a method for applying an agent around a circular-cylindrical object (10) with the tool (1).

10 Claims, 5 Drawing Sheets

(51) Int. Cl.

| | |
|---|---|
| ***B05C 17/005*** | (2006.01) |
| ***B05D 1/26*** | (2006.01) |

(56) References Cited

U.S. PATENT DOCUMENTS

| | | | | |
|---|---|---|---|---|
| 3,731,710 | A | 5/1973 | Bauer et al. | |
| 3,994,443 | A * | 11/1976 | Shenker | G03D 15/02 239/289 |
| 4,007,705 | A * | 2/1977 | Sherer | B05B 13/0436 118/710 |
| 4,076,175 | A * | 2/1978 | Bert | B05B 13/0214 239/588 |
| 4,995,749 | A * | 2/1991 | Gornik | B05C 17/0245 401/137 |
| 5,707,449 | A * | 1/1998 | Ohira | B05C 5/007 118/423 |
| 9,061,299 | B1 | 6/2015 | Fodor | |
| 10,940,499 | B2 * | 3/2021 | Pletcher | B05B 1/12 |
| 2017/0304866 | A1 * | 10/2017 | Hwang | B05D 1/28 |
| 2018/0021798 | A1 * | 1/2018 | Pletcher | B05B 13/0436 239/120 |

FOREIGN PATENT DOCUMENTS

| | | | |
|---|---|---|---|
| GB | 2507572 | A | 5/2014 |
| JP | 858189061 | A | 11/1983 |

* cited by examiner a)

b)

DEVICE AND METHOD FOR COATING A CIRCULAR CYLINDRICAL OBJECT

TECHNICAL AREA

The present invention relates to a tool intended for applying a liquid agent around a circular-cylindrical object, such as a pipe, hose, cable or the like.

TECHNICAL BACKGROUND

There are different ways to insulate pipes. Which method you choose depends, among other things, on costs, the purpose of the insulation and the environment in which the pipe will be located. Insulation is needed, for example, to thermally insulate, soundproof or pro-tect a pipe from external or internal attacks, e.g. corrosion. It can also be used to repair a damage, for example by applying a layer of chemical metal around a damaged metal pipe.

For example, water pipes are insulated by using strips of pipe winding with foam pipe sleeves that are to be cut and adapted. Joints or cavities where pipes come out of, for example, a wall, may need to be insulated. Disadvantages with these methods are that the sleeves must be cut to exact dimensions for fitting, which requires precise templates and some tools. But the joints will still need to be taped or glued to be tight so that leakage of, for example, heat, or corrosion attacks are avoided.

Expanded spray foam is often used to insulate cavities where the pipe enters a wall or other connection points. Insulating agents can, for example, be expandable foams, flexible elas-tomeric foams, rigid foams, polyethylene, cellular glass, and aerogels.

Foam insulation is stored in a pressurized can or container and is applied by spraying the foam to the place that needs to be insulated. There are some aids that facilitate application, for example, Smart Dispenser-straw (Great stuff) is a spout that is attached to the nozzle and thereby facilitates the application of the foam to the place to be insulated.

GB 2507572 provides a sleeve that facilitates application of foam to a pipe joint. As soon as the sleeve is fixed around the joint, foam can be applied or injected into the sleeve through a one-way valve. The foam can then circulate around but is held in place by the sleeve.

U.S. Pat. No. 3,731,710 provides a method and apparatus for applying insulating foam to a pipe by spraying. A subsequent bitumastic and a paper vapor-barrier is applied to the exterior surface of the insulation.

U.S. Pat. No. 1,988,628 provides an apparatus and a method for coating a pipe and the like with a bituminous mastic by extrusion. The pipe passes through an opening in a feeder that extends completely around the pipe and a rotating nozzle.

U.S. Pat. No. 5,707,449 discloses a ring-shaped coating apparatus having a distribution chamber of varying volume along its circumference.

US 20170304866 discloses a tool for coating a liquid on a tubular object having two arcuate members which are joined together by a hinge.

A disadvantage of known methods is that when sleeves are cut to insulate a pipe, joints arise which must be sealed with, for example, tape. A disadvantage when foam is used is that it is difficult to apply an even layer of agent (foam) around the pipe. The tools identified for the same purpose are unnecessarily complicated, heavy, and made up of many small parts. It is therefore a need for a simple and userfriendly tool which applies an even layer of, for example, a foam or other agent around an object, for example a pipe.

SUMMARY OF THE INVENTION

The present invention provides a device and a method for applying a liquid agent around an object.

More specifically, the invention relates to a tool for applying liquid agents such as, for example, an insulating foam, an adhesive, or paint to the mantle surface of a circular-cylindrical object, comprising a tool head having an axially through hole with a substantially circular cross-section, the tool head comprising:

- an inner flange in which the through hole in at least one axial position is delimited by an application surface, with an application radius, for guiding the tool along the object to be coated;
- an outer flange extending axially along the inner flange at a radial distance from the center of the hole, which radial distance is greater than the application radius;
- a distribution chamber extending around the inner flange and comprising at least one outlet at an inner end edge of the inner flange, leading out to the through hole where the outer flange extends axially after the inner flange, and which outlet is distributed around the through hole;
- at least one injection pipe to the distribution chamber to be able to supply liquid agent to the distribution chamber; and
- an asymmetrical restriction at the outlet so that the outlet is restricted where the pressure is as highest.

The asymmetrical restriction can in one example be provided by an inner cam of the outer flange, which inner cam has a varying radial distance from the through hole, preferably so that the distance is greater than the application radius.

The asymmetrical restriction can in one example at least partially be created between the object o be coated and the inner cam.

The asymmetrical restriction can in one example at least partially be created between the inner flange and the inner cam.

The outer cam can in one example be terminated with a release surface having a gradually increasing radius.

The tool head can in one example be divided into two halves so that the tool head can be passed over a circular-cylindrical object and then closed around it.

The tool can in one example further comprise two handles, one for each half, which handles are connected to each other via, for example, a hinge or a pin.

The handles can in one example be detachably arranged to the tool head.

Further is described a method for applying an agent around a circular-cylindrical object with a tool according to any of the preceding claims, comprising the steps:

- selecting a tool head where the application radius of the inner flange is slightly larger than the radius of the circular-cylindrical object;
- connecting a container comprising coating agent to the injection pipe;
- positioning the tool head to the circular-cylindrical object so that it runs through its through hole;
- increasing the pressure in the container until the agent flows out;
- moving said tool head along the object so that the agent is applied around said object;
- terminating the application; and removing the tool head from the object.

In one embodiment, one or more injection pipes may be provided. For example, in industrial use, pipes with large diameters may be coated and then more than one injection pipe may be needed.

DESCRIPTION OF EMBODIMENTS

The present invention will now be described in detail by means of embodiments and with reference to the accompanying drawings.

Other features and uses of the invention and its associated advantages will be appreciated by one skilled in the art upon reading the specification and the accompanying examples.

It will be appreciated that this invention is not limited to the particular embodiments shown herein. The following examples are appended for illustrative purposes only and are not intended to limit the scope of the invention as the scope of the present invention is limited only by the appended claims and equivalents thereof.

Unless otherwise defined, the terms used herein are intended to have the meanings commonly understood by those skilled in the art of the field to which the invention pertains.

The term "about" as used in connection with a numerical value throughout the specification and claims denotes an accuracy range well known and acceptable to one skilled in the art.

The term coating means that a film or layer of, for example, a foam, filter, paper, paint has been applied on the surface of an object, commonly called a substrate. Various coatings are often used to improve surface properties of the substrate, such as appearance, adhesion, corrosion resistance, abrasion resistance and scratch resistance.

The term mantle means that an object has an outer sheath, the outer sheath is applied by sheathing and the object/substrate is sheathed. In the description, the terms coating and mantle are considered synonymous.

The invention is described below with reference to a pipe, but other cylindrical objects such as cables and hoses can of course be coated with the described tool.

Figure 1:
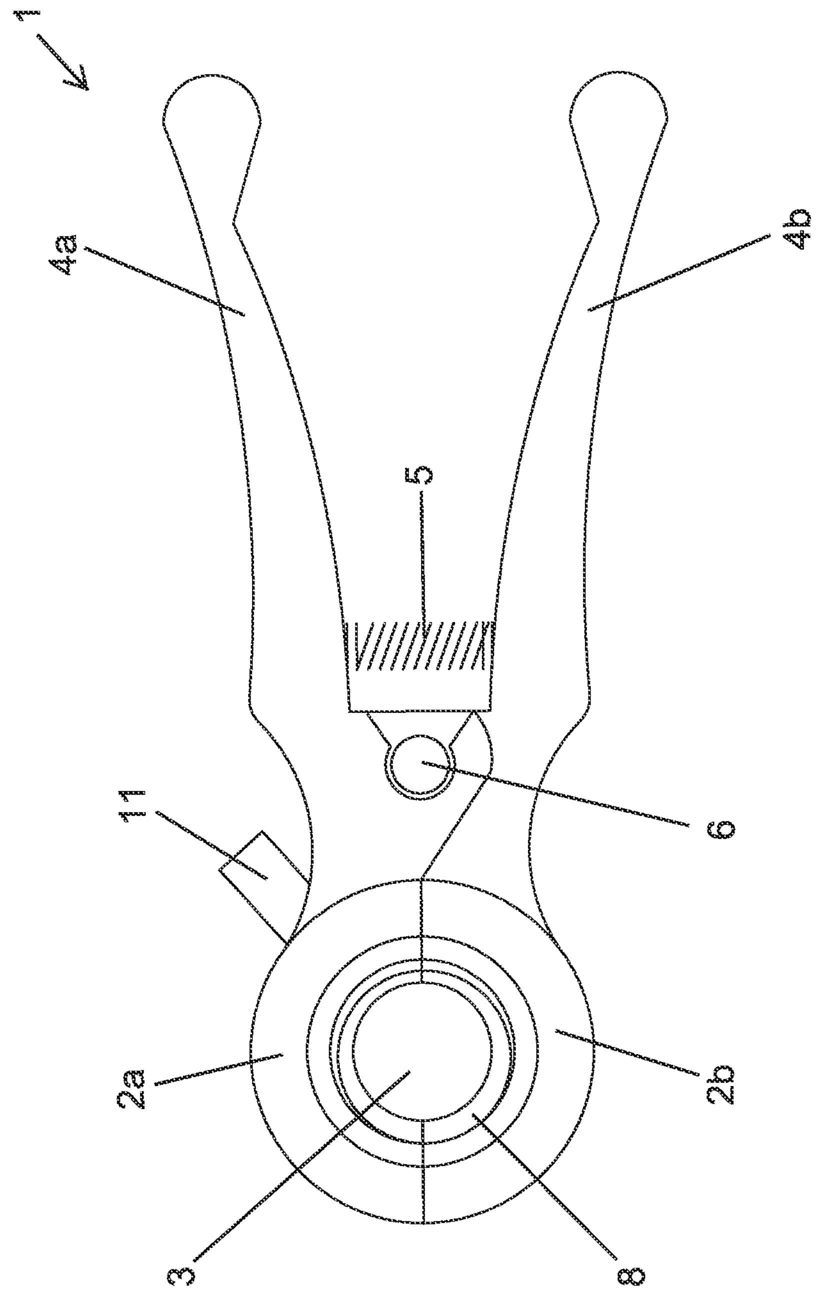
FIG. 1 shows the tool from above.

FIG. 1 shows a side view of a tool 1 according to the present invention. The tool comprises a tool head 2, with an axially through hole 3 having a substantially circular cross-section. The tool head 2 is in this embodiment divided into two halves 2*a*, 2*b*, so that the tool head can easily be passed over a pipe 10 (see FIG. 2) which is to be coated with a liquid agent, i.e. get a mantle, and then closed around it.

Furthermore, the tool 1 comprises two handles 4*a*, 4*b*, and in this embodiment a spring 5 is arranged between the handles 4*a*, 4*b*, and an injection pipe 11 to the distribution chamber 12 (shown in FIG. 2) to be able to supply liquid agent to it.

The handles 4*a*, 4*b* are connected to each other, for example via a hinge or a pin 6. The tool head can be opened and closed to facilitate the positioning of the tool 1 around a pipe or the like. The tool head 2 then comprises two halves 2*a*, 2*b* which move from a closed position to an open position by pressing the handles 4*a*, 4*b* together, or vice versa by opening the handles, like the mechanism of a pair of scissors. In the case of opening of the head by pressing the handles together, the spring 5 return the handles 4 to the initial position when the handles 4*a*, 4*b* are no longer pressed together.

In the open position a pipe 10 is positioned in the opening, then the tool head 2 is closed around the pipe to be able to coat the pipe all around with an even layer of liquid agent, for example an insulating foam, an adhesive, paint, or a chemical metal.

In a second embodiment the tool head 2 is not divisible. Then the pipe instead is in-serted/fed into the through hole 3 of the tool head, or vice versa, the tool head 2 can be arranged around the pipe 10.

Figure 2:
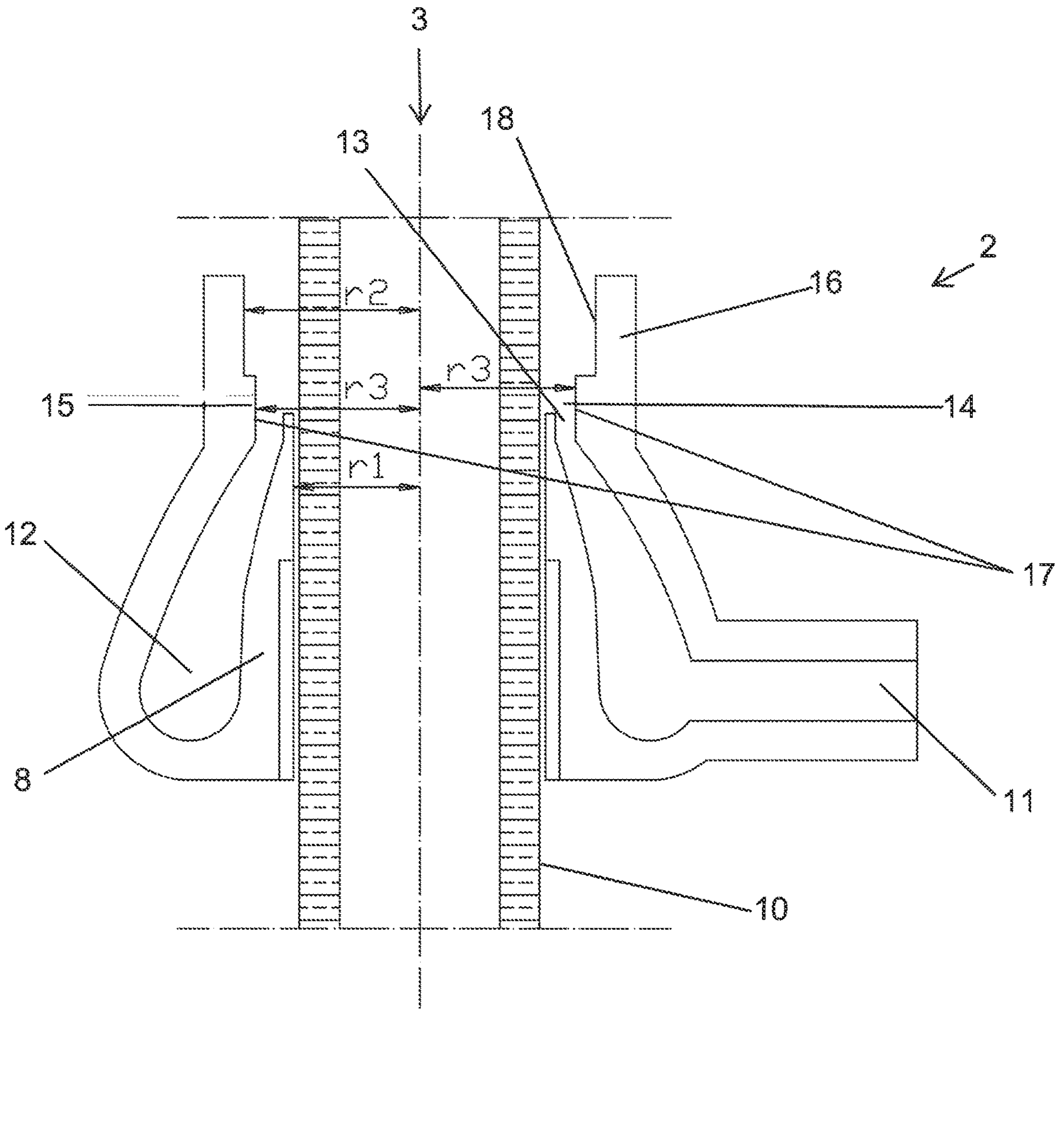
FIG. 2 shows a cross-section of the tool head around a pipe.

FIG. 2 shows a cross-section of the tool head 2 around a pipe 10.

The tool head 2 comprises an inner flange 8 where the through hole 3 in at least one axial position is delimited by an application surface 9, having an application radius r1, adapted to be guided along the pipe 10 to be coated. This can be done by selecting a tool head 2 which has an application radius r1 slightly larger than the radius of the pipe 10 to be coated.

For example, the application radius may be 0.3 mm larger than the radius of the tube 10 if a 12 mm tool head is used. The clearance can be adapted to the dimensions and surface of the pipe, e.g. 1-10% larger radius.

The tool head 2 further comprises an outer flange 16 which extends axially after the inner flange 8 at a radial distance from the center of the hole, which radial distance is larger than the application radius r1.

Preferably, the through hole 3 in at least one position is defined by a mantle forming surface 18 having a forming radius r2, which is larger than the application radius r1.

In this embodiment, the injection pipe 11 is arranged at the bottom of the tool head 2, so that the agent that is to be applied has the greatest possibility of reaching the back of the tool head 2, but it is not essential to arrange it close to the bottom. The injection pipe 11 is connected to a container (not shown), comprising the liquid agent to be applied. The container can, for example, be connected via a hose or other suitable part to the injection pipe 11. The container can be a pressurized container, or the pressure can be applied manually. The container comprising the liquid agent to be applied is not part of the present invention.

The liquid agent is led/pushed further into a distribution chamber 12 of the tool head 2. The distribution chamber 12 is for the agent to be evenly distributed around the pipe 10 and has a volume so that the agent can reach around the pipe 10.

The distribution chamber 12 runs around the inner flange 8, which leads out to the through hole 3 where the outer flange 16 extends axially after the inner flange 8. An injection pipe 11 leads to the distribution chamber 12 for supplying the liquid agent to it.

When liquid agent is supplied to the distribution chamber 12 the pressure will be highest on the side where the injection pipe 11 connects to the distribution chamber 12, and lowest on the opposite side. The outlet 13 is distributed around the through hole 3 and has an asymmetrical restriction, so that the outlet is restricted where the pressure is as highest 14. In the embodiment shown in FIGS. 1-4, the asymmetrical restriction is provided by an inner cam 17 of the outer flange 16. The inner cam 17 has a varying radial distance r3 from the center of the through hole 3. The varying distance r3 is preferably greater than the application radius r1, and at most equal to the formation radius r2, i.e. r1≤r3≤r2. At a position 14 closest to the injection pipe 11, the cam is at its highest (in radial direction) to gradually become lower towards the opposite side 15 where it is at its lowest.

The distance between the application surface 9 of the inner sleeve 8 and the mantle forming surface 18 of the outer flange 16 leaves a play so that the agent shall lie against the surface of the pipe 10. The mantle forming surface 18 of the outer flange 16 presses the agent against the surface of the pipe 10 to obtain sufficient adhesion.

The length of the inner flange 8 is preferably long enough to obtain lateral stability when the tool head 2 is advanced by means of the handles 4*a*, 4*b*.

Figure 3:
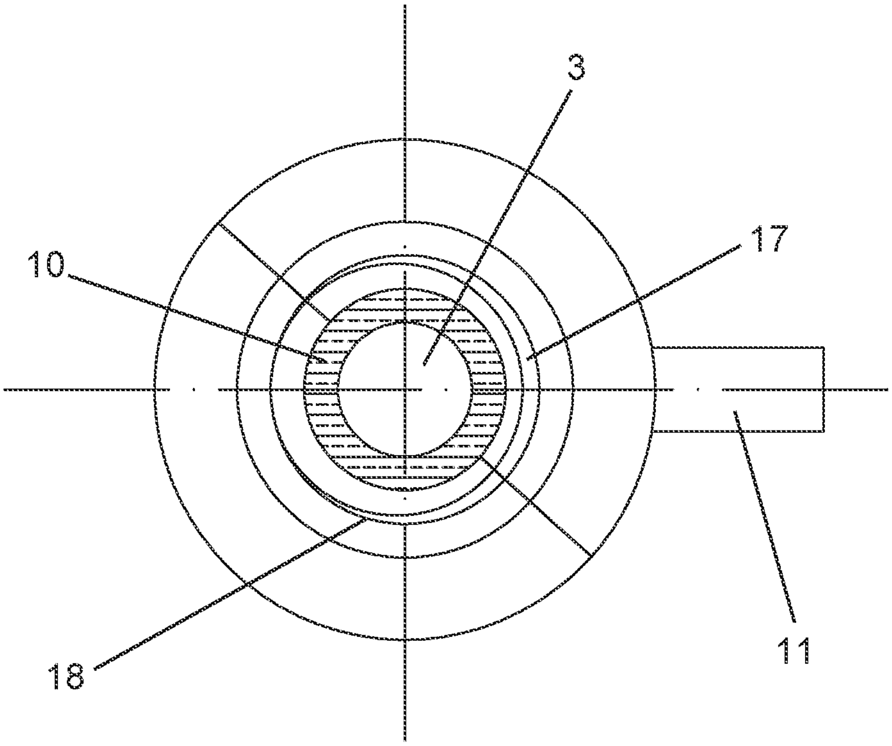
FIG. 3 shows the tool head from above around a pipe.
Figure 4:
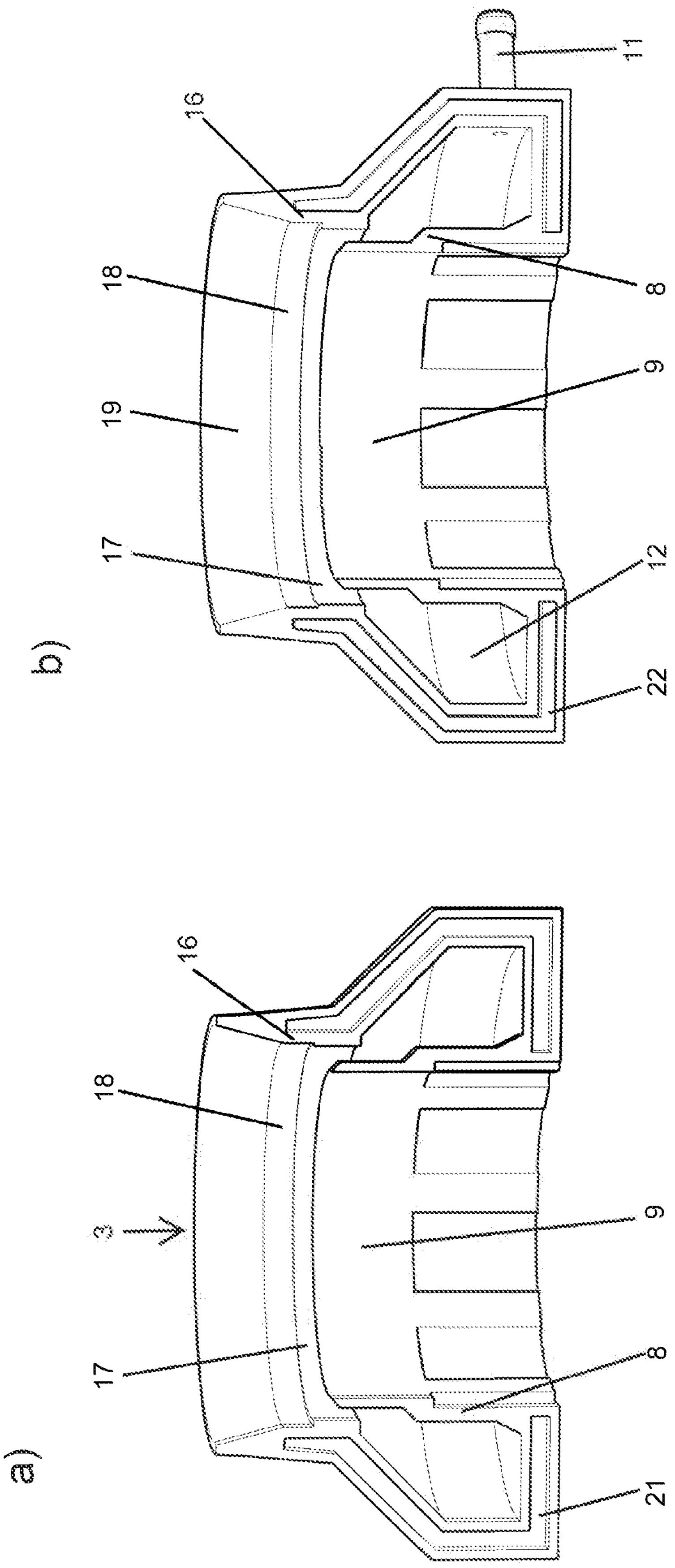
FIGS. 4*a* and 4*b* show a detailed view of the tool in cross-section.

FIG. 3 shows the tool head 2 from above arranged around a pipe 10. The drawing also shows the injection pipe 11, the inner cam 17, and the mantle forming surface 18.

FIGS. 4*a* and *b* show a detailed view of the tool head halves 2*a*, 2*b* with the addition that the outer flange 16 is terminated with a release surface 19 having gradually increasing radius. The release surface 19 can of course be combined with other embodiments. The halves 2*a*, 2*b* comprise at least one inner cam 17, or another part which creates a asymmetrical outlet 13. This is because the pressure is highest at the injection pipe 11, and lowest on the opposite side. The pressure in relation to the outlet 13 should give a constant amount of mass around the entire flange, i.e. the same amount of mass should exit regardless of where on the circumference of the pipe 10 it exits. The difference in radius between the application surface 9 of the inner flange 8 and the mantle forming surface 18 of the outer flange 16 creates a play for the agent to adhere against the surface of the pipe 10. The asymmetrical restriction is provided partly between the inner flange 8 and the inner cam 17. This fulfills the function that the inner flange 8 can have a greater clearance to the pipe to be coated, as the mantle here is formed independently of the pipe 10. It is also conceivable that the inner cam 17 lies axially outside of the inner flange 8 and only acts against the outer surface of the pipe 10.

The tool head can, for example, be sealed with male and female sealings 21, 22 to prevent the agent from being pressed out. Other solutions for achieving the same purpose are known to those skilled in the art.

The dimensions of the tool head 2 are scalable and can therefore be dimensioned so that the tool can be used by the general public as a hand-held tool, but it can also be used for coating larger pipes and then being adapted for industrial use. Several injection pipes may also be needed.

The tool 1 can be manufactured as a set, comparable to a socket wrench set, i.e. tool heads 2 are manufactured in different dimensions and are adapted to different purposes. Each respective tool head 2 can be mounted to the handles 4*a*, 4*b*. This means that one tool set can be comprised of handles 4*a*, 4*b* of different length/size and a number of tool heads with different dimensions.

The parts of the tool, such as the tool head 2 or handles 4*a*, 4*b* can be manufactured of different materials. The choice of material depends on the type of coating and size of substrate (pipe) it is intended for. For example, the parts of the hand-held tool 1 can be made of a light metal, for example aluminium. In one embodiment, a coating/alloy is applied on the metal so that the tool becomes smoother so that the coating agent does not stick.

In another embodiment, the entire tool 1 is manufactured in one piece, for example by molding. It could be made of, for example, a plastic to keep costs down. The tool head 2 is then cast to fit different dimensions. The size of the handles is adapted to the purpose.

The tool 1 may in one embodiment also include a support for better support and control when moving the tool forwards. A lock can also be included so that the tool can be locked in the closed position.

A container with coating agent is connected where a pressure is produced. Either the pressure is in the container, or it is built up manually. The connection is made with or without hose. The nozzle on the injection pipe may in one embodiment be movable to facilitate angling of the tool. The tool head 2 is arranged around the pipe 10, after which the pressure in the container is increased until it is seen that the agent flows out. Then the tool 1 is moved forward in a speed which leaves the desired thickness of the coating (mantle).

For example, commercial polyurethane foam that expands and dries can be used to insulate pipes. The agent applied to a pipe does not have to be for insulating purposes. For example, paint, adhesives, silicone, softener, etc. can also be applied with the present invention.

Coating of pipes 10 with different dimensions has been tested successfully, for example pipes with dimensions 6, 10, 12, 15 mm and 110 mm. The size does not limit the present invention.

Figure 5:
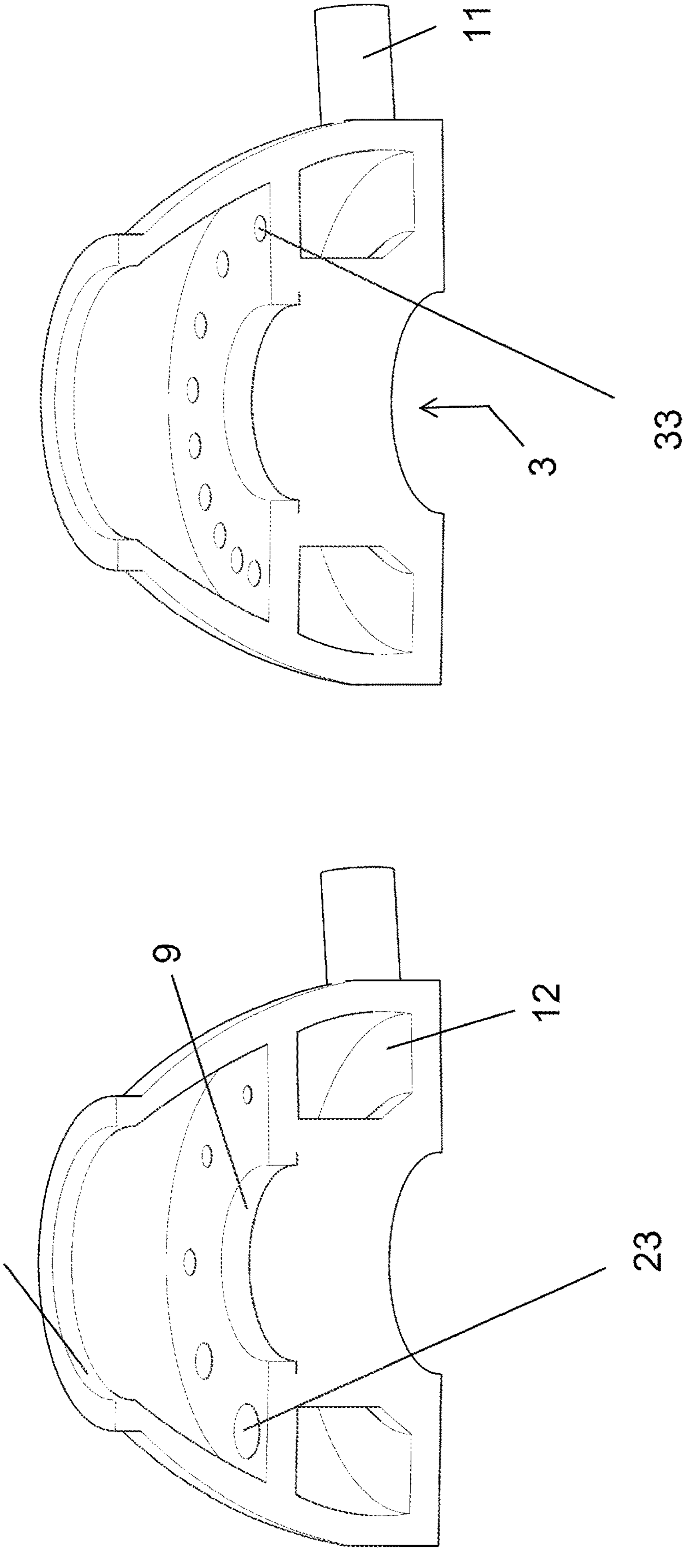
FIGS. 5*a* and 5*b* show alternative embodiments of the tool head in cross-section.

FIGS. 5*a* and *b* show further embodiments of the tool head, where the liquid agent is evenly distributed by means of different sized outlets 23 or distributed by means of different den-sities between the outlets. It is of course possible to combine density and size of the outlets in order to control that the outlet area is varied around the through hole. Of course, it does not have to be circular holes, but holes of all forms work just as well.

In summary, the present invention provides a tool that simplifies the process of coating a pipe with an even layer of agent. The thickness of the coating is regulated by how fast the tool is moved over the pipe.

With the tool, no accurate measurement needs to be made of pipes to be insulated. The tool is light and takes up little space, which means that you can easily bring tools that fit different pipe dimensions. Foam is cheaper than other insulation materials, does not form joints, provides no waste, takes up much less space during transport and is faster to apply than other insulation materials, which leads to lower labor costs.

The invention claimed is:

1. A tool for the application of liquid agent on a mantle surface of a circular-cylindrical object, comprising a tool head having an axial through hole with a substantially circular cross-section, which tool head comprises:

an inner flange where the through hole in at least one axial position is delimited by an application surface, having an application radius, for guiding the tool along the object to be coated;

an outer flange extending axially after the inner flange on a radial distance from the center of the hole which is greater than the application radius; and a distribution chamber running around the inner flange and comprising at least one outlet at an inner end edge of the inner flange, which leads out to the through hole where the outer flange extends axially after the inner flange, and which at least one outlet is distributed around the through hole;

at least one injection pipe to the distribution chamber in order to be able to supply liquid agent to the distribution chamber;

wherein an asymmetrical restriction is provided at the at least one outlet so that the at least one outlet is restricted where the pressure is the highest.

2. The tool according to claim 1, wherein the asymmetrical restriction is provided by an inner cam of the outer flange, which inner cam has a varying radial distance from the through hole.

3. The tool according to claim 2, wherein the radially varying distance is greater than the application radius.

4. The tool according to claim 2, wherein the asymmetrical restriction is at least partially created between the object to be coated and the inner cam.

5. The tool according to claim 2, wherein the asymmetrical restriction at least partially is created between the inner flange and the inner chamber.

6. The tool according to claim 1, wherein the outer flange terminates with a release surface having a gradually increasing radius.

7. The tool according to claim 1, wherein the tool head is divided into two halves so that the tool head can be passed over a circular-cylindrical object and then closed around it.

8. The tool according to claim 7, wherein the tool further comprises two handles, one for each half, which handles are connected to each other via a hinge or a pin.

9. The tool according to claim 8, wherein the handles are releasably arranged to the tool head.

10. A method of applying a liquid agent around a circular-cylindrical object with a tool according to claim 1, comprising the steps:

selecting a tool head where the application radius of the inner flange is slightly greater than the radius of the circular-cylindrical object;

connecting a container comprising coating agent to the injection pipe;

positioning the tool head to the circular-cylindrical object so that it runs through its through hole;

increasing the pressure in the container until agent flows out;

moving the tool head along the object so that the agent is applied around the circular-cylindrical object;

ending the application; and removing the tool head from the circular-cylindrical object.

* * * * *